April 6, 1954 F. R. BALCAR ET AL 2,674,581
PREPARATION OF A CHARGE FOR A CALCIUM CARBIDE FURNACE
Filed July 30, 1951

INVENTORS
FREDERICK R. BALCAR
HENRY B. SMITH, JR.
BY
ATTORNEY

Patented Apr. 6, 1954

2,674,581

UNITED STATES PATENT OFFICE 2,674,581

PREPARATION OF A CHARGE FOR A CALCIUM CARBIDE FURNACE

Frederick R. Balcar, Stamford, Conn., and Henry B. Smith, Jr., Maplewood, N. J., assignors to Air Reduction Company, Incorporated, New York, N. Y., a corporation of New York Application July 30, 1951, Serial No. 239,372

12 Claims. (Cl. 252—188.3)

This invention relates to a method of preparing a charge which is suitable for the production of calcium carbide in an electric arc furnace.

Calcium carbide is conventionally produced by the reduction reaction of carbon and calcium oxide in the arc zone of an electric carbide furnace. For efficient operation of the furnace, the furnace charge should comprise a homogeneous and intimate mixture of the carbon (usually coke) and calcium oxide (usually calcined limestone) in order to get a rapid carbide reaction in the electric arc furnace. However, pulverized mixtures of coke and calcium oxide are not suitable because in the bowl-like crucible of the furnace, the intensely hot gases generated by the electric arc at the tip of the electrode must escape through the overlying charge of raw material. If a pulverized charge is fed into the furnace, parts of the charge would soon be fused and tend to surround the electrode tip with a crater or gas-confining shell. This condition channelizes the escape of the reaction gases and thus prevents uniform preheating of the charge about to be reacted. Also the channelized gases entrain the small particles of the pulverized mixture above the reaction zone and thus cause a loss of raw materials.

To avoid some of the above disadvantages, it has been proposed to form calcium oxide dust and coke dust into pellets. However, this proposal is disadvantageous because of the relatively high cost of separately preparing coke and calcium oxide and then forming these materials into pellets. Further, to form a pellet of calcium oxide dust and coke dust it is probably necessary to use a binding agent, such as pitch or asphalt, since the pellet otherwise would not withstand the handling between the pelletizing operation and the furnace which is necessary in large-scale carbide production. Also, such pellets do not adequately withstand the high-temperature conditions in the carbide furnace and soon crumble into powder.

It has been proposed to solve the aforementioned problem of undesirable costs and other disadvantages in the use of calcium oxide and coke by forming pellets from an inexpensive calcium oxide source, such as calcium hydrate (acetylene generator by-product) and inexpensive soft coal; and then firing (coking and calcining) the pellets in a single operation.

The use of soft coal and by-product hydrate particularly provides substantial savings in the cost of raw materials. This by-product calcium hydrate results when acetylene is generated by the reaction of calcium carbide and water. The increased demand for acetylene, such as for synthetic rubber production, has resulted in huge waste deposits of the hydrate. Normal demands for calcium hydrate have not made appreciable inroads into these deposits and it is obvious that utilization of this by-product would effect economies and alleviate disposal problems.

However, the use of soft coal and by-product hydrate or limestone, another relatively inexpensive source of calcium oxide, in pellets for calcium carbide production has presented difficulties, particularly in the coking of the coal and the calcining of the hydrate or carbonate in the pellet in a single operation. The coal must be essentially coked or reduced substantially to carbon by driving off volatile constituents since bituminous coal cannot, as such, be used as a source of carbon in the carbide furnace because of its plastic properties which cause a fusion encrusting of the furnace charge, thereby preventing the steady escape of the gases formed in the calcium carbide reaction. Since the relative proportions of the eventual carbon and calcium oxide in the pellet must be made suitable for the commercial carbide reaction, it is desirable that the firing operation does not cause any substantial loss of fixed carbon from the original soft coal. This loss of fixed carbon, in addition to making it difficult to provide the proper proportions of coke and lime in the fired pellet for the carbide reaction, would ordinarily be uneconomical as well.

The calcination of the hydrate or carbonate by driving off water and carbon dioxide respectively should be essentially complete, since heat used for this purpose, which would be derived from electrical energy (a high-cost source of energy), increases the total electrical power which is required for the production of carbide.

Other considerations involved in the use of soft coal and an inexpensive source of calcium oxide are that the mixture must be easily formed into a pellet and that the pellet must be able to withstand handling prior to as well as after firing. The components of the pellet must be properly cohered prior to firing so that they can be conveyed from the pelletizing operation to the firing operation. After firing, the pellet will be moved to the carbide furnace. During this handling, the pellet must be able to withstand abrasion and dropping so that dust or chipped-off fragments (fines) will not present a serious problem or loss. Not only is durability or high physical strength during this handling necessary, but also the pellet should be durable to a sufficient extent when exposed to the heat in carbide furnaces. At this stage, the longer the pellet remains intact and does not disintegrate prior to the carbide reaction, the longer the hot gases from the carbide reaction will be able to pass freely through the interstices among the pellets for uniform preheating.

With the above problems in mind, it is an object of our invention to provide an improved autothermal method for preparing durable pellets for charging into a calcium carbide furnace.

It is a further object of our invention to provide an improved firing method wherein soft coal is coked and a source of calcium oxide is calcined in a single operation with a minimum fixed carbon loss.

Another object is to provide extruded pellets of coking coal, calcium hydrate and limestone which are of adequate strength to withstand handling prior to firing and which can be satisfactorily fired to produce a suitable calcium carbide furnace charge.

A further object is to provide an integrated pelletizing method for a carbide furnace charge wherein available byproduct heat sources are efficiently utilized.

The foregoing and other objects are accomplished in accordance with the preferred embodiment of our invention by forming a properly-proportioned, homogeneous, intimate mixture of powdered bituminous coal which will fluidize sufficiently and form a hard aggregate with the calcium oxide source and powdered calcium carbonate and powdered calcium hydrate or a similar mixture of coal and hydrate, extruding and cutting this mixture into pellets, drying the pellets, coking and calcining the components of the pellets in a firing zone by incompletely burning the coal volatiles with a regulated, preheated air supply, moving the pellets and air co-currently through the kiln so that the products of the incomplete combustion provide a non-oxidizing atmosphere as the co-current flows proceed, and utilizing the heat sources in the flue gases from the coking and calcining step to dry the pellets and preheat the air supply.

The invention will now be further described by reference to the accompanying drawings in which.

Figure 1:
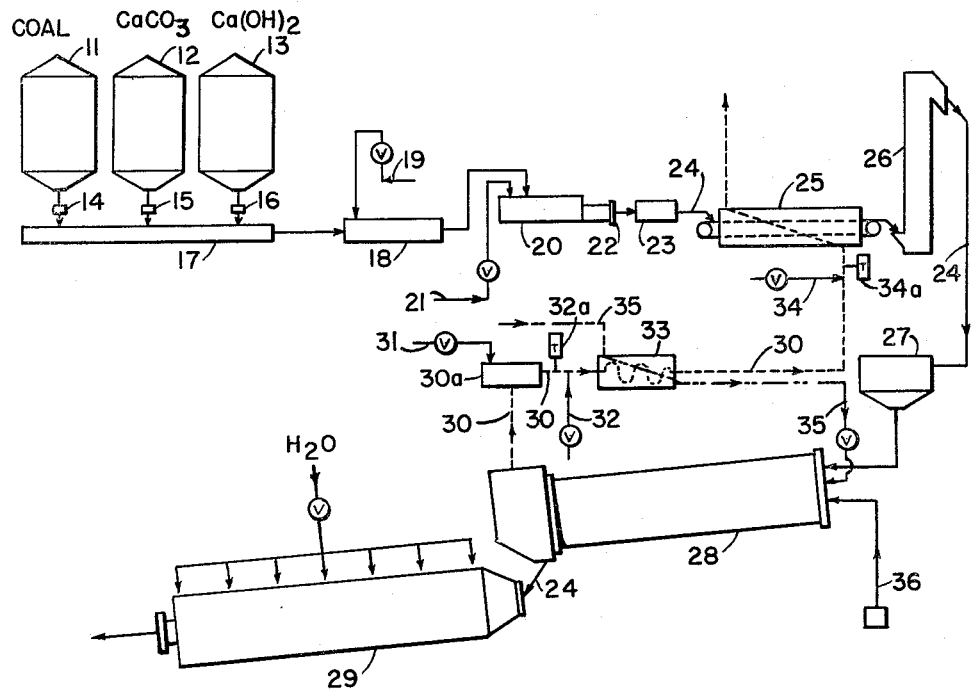
Fig. 1 is a flow diagram of the entire process for the preparation of the charge.

The hoppers for the various raw materials are shown in the upper left hand portion of the flow diagram shown in Fig. 1 and are designated 11, 12, and 13. The coal hopper 11 contains a suitably fluidizing bituminous coal which has been pulverized to less than 20 mesh (to pass a 20 mesh U. S. Standard screen) by conventional means which have not been shown. The carbonate hopper 12 contains high purity limestone which has also been pulverized to less than 20 mesh by conventional means which have not been shown. The hydrate hopper 13 contains hydrate of about 200 mesh which has been processed into a substantially dry powder by conventional methods or which is the powdered by-product from dry acetylene generation.

At the bottom of the hoppers 11, 12, and 13, automatic weighers 14, 15, and 16 are provided for respectively feeding the proper proportions of raw materials into the horizontal mixing conveyor 17 which is located beneath the weighers. The horizontal conveyor discharges the raw materials into a conventional mixer or pug mill 18 wherein an intimate and homogeneous mixture is obtained with the addition of water through valved inlet 19. The consistency of the mixture, after the water is added, is about that of a stiff mortar, suitable for extrusion.

From the pug mill the mixture is conveyed to extruder 20. If required, more water can be added to the mixture in extruder 20 through valved inlet 21. The mixture of raw materials is extruded under pressure through the die 22 of the extruder 20 and is cut into pellets by cutter 23. The extruder die 22 preferably has straight bores which, for example, may be one and one quarter inch in diameter and about three inches in length. The cutter 23 is preferably adjusted so as to cut the cylindrical strands of raw material into pellets about one and one quarter inches in length.

From the cutter 23 the wet, extruded pellets are conveyed, as indicated by the pellet flow path 24, to the pellet drier 25. In the drier 25, the water which was added in order to facilitate the extrusion of the pellets is removed so that the water will not flash into steam in the subsequent high temperature firing step and so disintegrate the pellets, and so that evaporation of water during firing will not interfere with the ignition of coal volatiles. The drier is maintained at about 400° F. and is provided with conventional means (not shown) for regulating the residence time of the pellet therein.

From the pellet drier 25 the dried and heated pellets are raised by a conventional elevator 26 to a separator or screen 27 of the usual type which removes any chips or small particles which may be carried along with the pellets. Next the pellets are fed downwardly to the sealed rotary kiln 28 where the coal is devolatilized and coked, and the calcium oxide source is calcined in a novel manner which will be described hereinafter. Finally, the fired pellets which are now composed of calcium oxide and coke are conveyed to the water-cooled rotary cooler 29 where the pellets are cooled in order that during their subsequent storage or handling the hot pellets will not react with the oxygen in the air. By regulating the flue discharge from the kiln 28 with conventional means to provide a slight positive pressure, it is possible to prevent air from entering the rotary cooler 29 since the cooler would also be under a slight pressure.

After cooling in the rotary cooler, the pellets are conveyed to storage means (not shown). When immediate feeding to the electric arc carbide furnace is desired, the rotary cooler 29 would be omitted.

The flue gases (containing some combustible gases) which leave the lower exit portion of the rotary kiln 28 through conduit 30 are burned completely in combustion chamber 30a in order to get the entire heat energy which is available in the flue gases. Air, to support this combustion, is admitted to chamber 30a by means of valved inlet 31. The hot combustion products can next, if desired, be "tempered" or cooled by the addition of air through valved inlet 32, after observing temperature indicator 32a in conduit 30, and then they pass through heat exchanger 33. This "tempering" of the combustion products is done to control the temperature in the heat exchanger, and it also may enable use of an inexpensive heat exchanger which would not be capable of withstanding the high temperature of the combustion products obtained by burning the kiln flue gases. The combustion products passing through heat exchanger 33 give up part of their heat to the combustion air in conduit 35 leading to the rotary kiln; and so preheat the air which goes to the kiln.

After preheating the air for the rotary kiln 28 in heat exchanger 33, the flue combustion products in conduit 30 are used to dry the pellets in pellet drier 25. If necessary for the proper drying of the pellets, the combustion products can again be tempered by admitting air through valved inlet 34. The valve in conduit 34 is adjusted according to the temperature shown on temperature indicator 34a in conduit 30 so that the proper drying temperature results. Conduit 30 has conventional adjustable exhaust blowers (not shown) in order to maintain the proper flow of exhaust gases.

Figure 2:
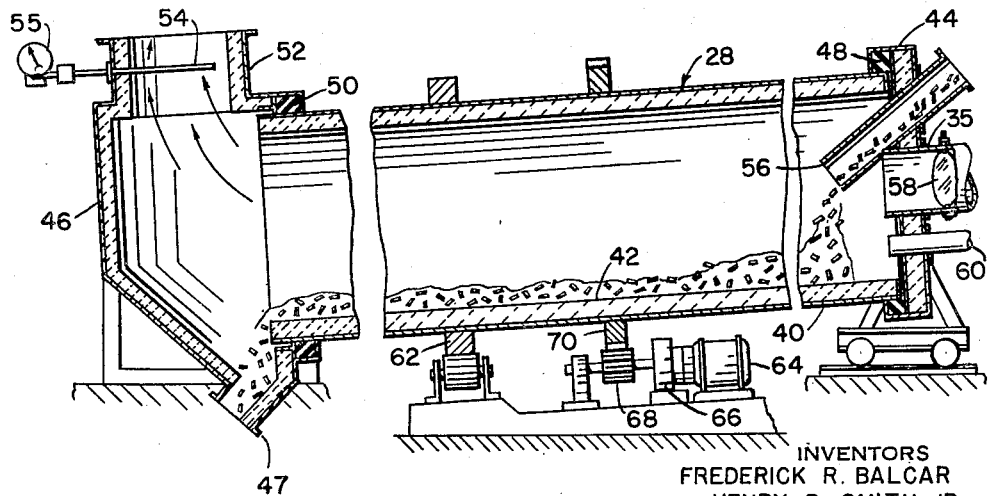
Fig. 2 is a schematic cross-sectioned side elevation of the rotary kiln used for the coking and calcining operation.

Referring to the inclined rotary kiln 28 in Fig. 1, it can be seen that the preheated combustion air is supplied to the entrance end of the kiln by means of valved conduit 35, which has near its intake a conventional blower (not shown). Conduit 35 carries the preheated air from the heat exchanger 33, which is heated by the combustion products as above described. An auxiliary heating system 36 is provided for starting purposes and/or providing supplemental heat to the kiln 28. The heating system 36 preferably is used only to bring the kiln up to operating temperatures prior to the establishment of the autothermal operating conditions which are described hereinafter. The details of the rotary kiln 28 will now be described with reference to Fig. 2.

The inclined rotary kiln has a large central tube 40 which may be, for example, about seven feet in diameter. The tube is interiorly lined with six inches of fire brick 42. At each end of the tube, two stationary hoods 44 and 46 are provided and seal the tube 40 against the entrance of air. The sealing means for preventing the admission of air on each end or hood are schematically shown as annular gaskets 48 and 50 which contact the outer surfaces of the ends of the tube 40. Any of the well-known sealing means can be used. The exit hood 46 preferably has a larger volume than the entrance hood 44 and it may be water-cooled by means not shown. The upper part of the exit hood is provided with a flue gas duct 52 which connects with exhaust conduit 30. A thermocouple 54 extends into duct 52. The temperature indicator 55 is shown outside of the exit hood and is connected to the thermocouple 54. The lower part of exit hood 46 has an outlet 47 for the discharge of pellets after they are fired.

The stationary entrance hood 44 has a pellet feed conduit 56 passing through upper part of the end of the hood so that pellets will fall into the bottom of the rotatable tube 40. The conduit 35 for preheating air, which has an adjustable valve 58, enters the center of the end of the entrance hood 44. Below the preheated air conduit 35, a conventional oil or gas burner 60 of the auxiliary heating system 36 (Fig. 1) enters the entrance hood 44.

The overall length of the kiln is, for example, about 70 feet and it may be inclined 3/4" per foot of length. The tube 40 is rotatably mounted by conventional means 62, one of which is shown schematically on the drawing. The tube 40 is rotated by variable speed motor 64 through gear reduction box 66 and driving spur gear 68 which meshes with a ring gear 70 on the periphery of the tube 40. The arrangement is such as to provide speeds of from 0.5 R. P. M. to 1½ R. P. M. by controlling the speed of the motor 64 with conventional means (not shown).

The thermocouple 54, having temperature indicator 55, in the flue duct 52 can be used with conventional automatic means (not shown) to control the amount of preheated air which enters the kiln 28 by being suitably connected to valve 58 in preheating air conduit 35. Also, the thermocouple 54 could similarly, in addition, be used to regulate the temperature of the preheated air by controlling the amount of tempering air which is added through valve inlet 32 to the combustion products going to the air preheater.

The difficulties in coking and calcining, in a single operation, pellets which are made of soft coal and calcium oxide source will be better appreciated by considering some of the basic chemical reactions which may be involved.

The principal reactions are as follows:

Coal+heat→carbon+volatiles
Volatiles+air→heat+CO+$CO_2$+$H_2O$
Carbon+oxygen→carbon dioxide
Calcium hydrate+heat→calcium oxide and water
Calcium carbonate+heat→
    calcium oxide+carbon dioxide
Carbon+water→carbon monoxide+hydrogen From the foregoing it can be seen that in order to be assured of obtaining calcium oxide, it is necessary to promote the reversible disassociation of calcium carbonate to calcium oxide and carbon dioxide and yet to prevent calcium oxide and carbon dioxide from combining to form calcium carbonate. This requires a high temperature which will in turn tend to cause the oxidation of carbon if oxygen or water contacts carbon. This oxidation would cause a loss of the fixed carbon or coke from the original soft coal.

The instant invention minimizes any fixed carbon loss and provides other advantages through the provision of a novel, autothermal firing process in which there is a co-current flow of pellets and the gases which are present in the process.

In operation, the rotating kiln 28, while being properly heated by burner 60, receives a stream of dried, relatively cool pellets which are a homogeneous and intimate mixture of soft coal and a calcium oxide source (for example, a mixture of soft coal with calcium carbonate and calcium hydrate) in proportions of carbon to calcium oxide which are suitable for the production of calcium carbide in an electric arc furnace. Preheated, relatively hot, air from heat exchanger 33 is supplied at suitable temperatures to the kiln through valved conduit 35 in controlled amounts.

During the initial phase of the firing operation (the firing operation embraces the period between the time of entry of the pellets into the kiln and the time of their discharge therefrom), a portion of the coal volatiles is initially evolved from the pellets by the heat in the hot kiln. Because the temperature of the kiln atmosphere at the inlet end of the kiln is above the ignition temperature of the volatiles, this portion of the volatiles then burns with oxygen in the preheated air and liberates heat. The heat so liberated causes a further sequential devolatilization and combustion of coal volatiles. This makes the process autothermal; i. e. no supplemental or additional heat need be provided. Once the kiln has been placed in operation and assuming a coal with sufficiently high volatile content (for example 35% volatiles by weight) is used, the burner 60 may be shut down and the firing operation is accomplished with the heat liberated by the burning of coal volatiles. The temperature of the pellets is gradually increased by the heat from the combustion as the pellets move down the kiln and this causes a completion of the devolatilization of the coal. The volatiles evolved after the initial phase react with substantially all of the remaining available oxidants in gaseous stream in the kiln and form a non-oxidizing kiln atmosphere consisting of the residual preheated air (nitrogen) and the products of the reactions. Complete oxidation of the volatiles will not result since the coal is so selected and the combustion air so regulated relative to the stream of pellets that the quantity of volatiles always exceeds the stoichiometric amount necessary to combine with all the oxygen available in the combustion air, so that the kiln atmosphere downstream of the combustion zone is devoid of oxygen.

As the pellets move down the kiln they become progressively hotter by reason of the heat transmitted thereto by radiation, conduction, and convection from the kiln atmosphere passing thereover. When a pellet temperature of about 1150° F. is reached, the hydrate in the pellet effectively breaks down to form water vapor (which passes into and is carried away by the flowing kiln atmosphere) and calcium oxide which is retained in the pellet. The temperature of the pellets increases still further as they move on down the kiln and, after the pellets reach a temperature of about 1650° F., any calcium carbonate present effectively disassociates into carbon dioxide (which passes into and is carried away by the kiln atmosphere) and calcium oxide which is retained in the hot mass of devolatilized coking coal. The pellet temperature is maintained high enough as it approaches the lower end of the kiln so that substantially all portions of the mass constituting each pellet will be raised to a temperature above 1650° F. (for instance, about 1850° F.) and so substantially all the calcium present will be in the form of the oxide rather than the carbonate. The residence time of the pellets in the kiln (the time during which they are exposed to the kiln atmosphere) may be regulated by controlling the speed of rotation of the kiln by means of variable speed motor 64. The temperature in the kiln is regulated by controlling the quantity of combustion air and the preheat temperature thereof. This may be done by means of the valves in conduits 35 and 32, which are manually adjusted to provide a predetermined temperature (for example 2000° F. for a maximum pellet temperature of 1850° F.) at the location of thermocouple 54.

Since the rate of introduction of air is so proportioned relative to the flow of pellets that the kiln atmosphere rapidly becomes devoid of oxygen as it moves through the kiln, an oxygen-free atmosphere is soon provided in the kiln. It has been found that, with the disclosed process, the possible heat from the coal volatiles can be efficiently utilized by burning them in an enclosed kiln immediately upon their evolution from pellets being fired in the kiln and without any appreciable loss of fixed carbon. It is believed that the reason for such low loss of fixed carbon is that in the initial phase of the firing the rapid evolution of large quantities of gases and vapors from the pellets prevents the initial supply of oxygen in the preheated air from reacting with the carbon in the coal. In the subsequent firing, even though the rate of evolution of gases may taper off to a smaller value, interaction between the carbon in the pellets and the kiln atmosphere apparently will not appreciably occur because the kiln atmosphere will by then have become devoid of oxygen due to the prior reaction of substantially all the oxygen therein with the volatiles previously educed from the coal. Thus it has been found possible to form a pellet of soft coal with lime hydrate and lime carbonate which can be heated to extremely high temperature (for example, 1850° F.) by the co-current flow process of the present invention, and by the efficient utilization of volatiles evolved from the coal, without incurring undue loss in the fixed carbon of the coal. Also, apparently no appreciable loss of carbon due to other possible reactions, such as the water-gas reaction, occurs with the process according to the present invention. Possibly the reason is that, with the co-current flow process as described herein, the pellets are progressively raised in temperature as they move down the kiln and thus any water present (as from the lime hydrate) may be driven off and carried in the kiln atmosphere away from direct contact with the pellets before the pellets are raised to the temperature at which the water-gas reaction would occur.

The composition of the pellets may be varied to suit local conditions relative to the supply, purity and cost of calcium hydrate or calcium carbonate respectively.

In locations where the by-product hydrate is not an economically feasible raw material, limestone of the proper purity is used, such as the high calcium limestone from parts of the Spergon seam in Missouri and Illinois. In order to obtain a carbonate pellet which is durable during the pre-firing handling, it is necessary to include some calcium hydrate to serve as a coherer. We have discovered that a pellet which has a quantity of calcium carbonate which will provide, after calcining 85% by weight of the required calcium oxide for the carbide melt and which pellet has calcium hydrate as a binder and as the source of the remaining 15% of the required calcium oxide, is eminently suitable for large-scale carbide manufacture. Somewhat less water for proper mixing and extrusion is required in an 85%–15% cabonate-hydrate pellet than in an all-hydrate pellet, since the larger size and basic quality of the carbonate permits easier wetting.

When an all-hydrate pellet is economically feasible, it may be necessary, depending on the mixing equipment, to provide means for permitting the wet extruded pellet to "set" for a certain period prior to drying so that the pellet will withstand the drying operation.

It has also been determined that a 50%–50% carbonate and hydrate pellet (proportioned as above described) can be satisfactorily fired by using the method of the instant invention.

The same type coal is used with either the hydrate pellet or the limestone pellet. The coal should be a suitable bituminous coal which has a good fluidizing property when heated and a low ash content. The coal from the Coal Mountain seam near Powelltown, West Virginia, is suitable and has typically the following composition: Fixed carbon 63.7%; volatiles 32.1%; ash content 4.2%. Among the other suitable coals are the following:

| Name | Fixed Carbon | Volatiles | Ash |
| --- | --- | --- | --- |
| | Percent | Percent | Percent |
| Pond Creek Majestic Coal | 59.4 | 33.6 | 7 |
| Elkhorn Coal | 59.9 | 35.6 | 4.5 |
| #2 Gas | 60.3 | 34.3 | 5.4 |

It is, of course, possible to use a coal having a lower percentage of volatiles and to supply the remainder of required heat, since operating with incomplete combustion, by means of burner 60 or other conventional means. For instance, Marianna coal from the Sewell seam in West Virginia (having 72.7% fixed carbon, 21.9% volatiles, 5.2% ash content) can be used. This coal must have good fluidizing property; that is, the capacity to form a hard aggregate with small particles when heated.

The theoretical proportions of carbon (coke) to calcium oxide (calcined carbonate-hydrate or calcined hydrate) in the pellet for the carbide reaction would be 1:1.55 as can be determined from the chemical equation, $$CaO + 3C = CaC_2 + CO$$

However, the usual commercial practice increases the proportion of calcium oxide in order that a free-flowing melt in the carbide furnace can be obtained. The calcium carbide melt or eutectic mixture which gives suitable flow or tapping characteristics contains about 80% calcium carbide. In order that this fluxing function can be provided, the ratio of carbon to calcium oxide is increased to about 1.0 to 1.75. Thus, whether a carbonate-hydrate pellet or a hydrate pellet is used, the calcium oxide will be proportioned to carbon in accordance with the above commercial ratio.

In the use of either hydrate or carbonate-hydrate, the proper weights of each would be calculated by considering each as a calcium oxide source. Likewise, the weight of coal could be calculated on the basis of being a source of carbon (the fixed carbon of the original coal).

It is to be noted that the pellets are continuously tumbled as they gradually progress through the kiln so that all portions thereof are uniformly and directly exposed to the radiant heat from the combustion occurring in the top portion of the kiln.

Figure 3:
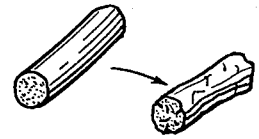
Fig. 3 is a showing of the transformation which occurs in drying and firing of a wet extruded pellet.

During the firing operation and the subsequent cooling, the dried pellet is transformed into a hard pellet which has a honey-combed structure of coke with calcium oxide particles embedded therein. The coal, because of its agglutinating property, apparently fluidizes into a semi-fluid retentive plastic which on coking forms a hard, rigid honey-combed structure around the calcium oxide. This hard pellet will withstand the handling between the rotary kiln and the carbide furnace, incident to large scale carbide operations; and the formation of fines or small particles due to dropping or abrasion does not occur to any appreciable extent. The transition of the wet pellet which occurs during the drying and firing operations is shown in Fig. 3. The illustration on the left represents a wet extruded pellet and the illustration on the right represents the pellet after firing.

In order to completely utilize kiln by-products, the flue gases are removed from the rotary kiln through conduit 52 in the top of exit hood 46 and conveyed by conduit 30 to the combustion chamber 30a shown in Fig. 1. In chamber 30a the flue gases are completely burned by the addition of air through valved inlet 31 in order to obtain the total available heat in the flue gases. The combustion products so formed are then passed to air preheater 33 where they give up some of their heat to preheat the air which will support the partial combustion of the coal volatiles in rotary kiln 28. After this preheating, the flue combustion products are conveyed to pellet drier 25 where the remaining portion of their heat is used to dry the wet extruded pellets which are to be fed to the rotary kiln.

The flue combustion products can also be used to dry the calcium hydrate which is obtained direct from wet acetylene generation or from hydrate deposits.

In order that important details of the foregoing preparation and treatment of pellets may be better understood and conveniently carried out, a detailed example of a procedure which may be used in the practicing of our invention will now follow.

Soft coal from the Coal Mountain seam near Powelltown, West Virginia (having the composition above described), is pulverized to a mesh of less than 20 (U. S. Standard screen) and stored in hopper 11. The coal is dried if necessary, prior to pulverizing, to reduce its free water content below 5%.

Calcium hydrate is "mined" from an acetylene by-product hydrate deposit or "pond" and is centrifuged in order to reduce the average 50% free water content in the by-product. The centrifuging is continued until the water content is reduced to about 40% and then the by-product hydrate is further dried by using waste heat from the carbide plant or other sources. The waste-heat drying transforms the by-product hydrate into a "dry" powder having less than 12% free water. This powder is about 200–300 mesh and, after the above drying, is placed in hopper 13.

The soft coal and by-product hydrate is then weighed in proper amounts by the automatic weighing means 14, 16, at the bottom of their respective hoppers 11, 13. Excluding the free and combined water content in the hydrate and the ash content and volatile matter in the coal, the two are mixed with the ratio of carbon to calcium oxide being about 1 : 1.75 as is the usual practice for a good melt in the carbide furnace. The coal and hydrate are then mixed and conveyed in mixing conveyor 17 to pug mill 18 where the addition of water and further mixing is made so that an intimate homogeneous mixture results which will be suitable for a rapid carbide reaction. From pug mill 18 the plastic mixture of coal and hydrate is conveyed to extruder 20 where more water is added in sufficient quantity so that the stiff-mortar-like mixture can be easily extruded. The amount of water which is added appears to be critical and the total amount should not exceed a 22–26% range on a wet basis, that is, 22–26% by weight of the pellet should be water. After being extruded, these rods or strands of the mixture are cut into pellets 1″ to 3″ in length by cutter 23.

The pellets are then dried at a temperature of 400° F. in drier 25 with a residence time of about 40 minutes. In this manner, devolatilization of coal and ignition thereof is prevented. From the drier, the pellets are passed to the rotating kiln 28 which is preheated by burner 60 to about 2000° F.

The rotary kiln is rotated at a speed which provides, with the inclination of ¾" per foot of length, a residence time for a pellet of about 30 minutes. The temperature in the kiln is controlled by maintaining the flue gas temperature at 2000° F. by the means described above. Thus, if temperature indicator 55 indicates a temperature lower than 2000° F., the valve 58 in conduit 35 is opened more to permit a larger flow of preheated air to enter the kiln.

The remaining combustibles in the kiln flue gases, which consist primarily of nitrogen, methane, hydrogen, carbon monoxide and carbon dioxide, are burned in the air-supplied combustion chamber 30a and then are cooled to about 900° F. by adding tempering air through valved inlet 32. The combustion products, after preheating the kiln air supply to 500–800° F., are further cooled by adding tempering air through valved inlet 34 to about 400° F. and then used in the pellet drier 25. After drying the pellets, the gas flow is used to dry the by-product hydrate as above described or is discharged to a stack (not shown).

The pellets, after being calcined and coked and having a temperature of about 1800° F., are discharged into cooler 29 which has an exterior water spray where they are cooled to about 300° F. so that air will not oxidize the carbon in the hot pellets. The entry of air into pellet cooler 29 is minimized by connection between the kiln and the cooler and the regulation of the kiln flue gas flow by means (not shown) so that a slight positive pressure is maintained in the cooler.

Pellets made in accordance with the invention have been found to be of particularly high physical strength, and to have the desired proportions of reactants to produce calcium carbide in an electric furnace. These reactants are intimately and homogeneously mixed to form a carbide furnace charge of very high quality which can be manufactured more efficiently and economically than possible with previously known methods. It is to be understood that the term "pellet" or "pellets" is used herein in a broad sense to include various types of discrete masses, regardless of shape.

The invention is not limited to the specific embodiment herein illustrated and described, but may be used or carried out in other ways without departure from its spirit as defined by the following claims.

We claim:

1. The method of preparing a charge for a calcium carbide furnace, said method comprising the steps of making a mixture of small particles of a calcium oxide source material, selected from the group consisting of calcium hydrate and calcium carbonate, and of small particles of bituminous coal having a high proportion of volatiles, proportioning said particles so that the ratio of fixed carbon to calcium oxide is within the range from about 1:1.55 to about 1:1.75 by weight, forming said mixture into small pellets, continuously introducing a quantity of said pellets and a quantity of preheated air into the same end of a sealed firing zone, evolving the volatiles from said coal, incompletely burning said volatiles as evolved by regulating the quantity of preheated air, calcining said calcium oxide source material with heat from said burning, moving said pellets and gaseous products from said incomplete combustion co-currently through said firing zone so that an atmosphere free of oxygen exists in at least that portion of said zone downstream of the point at which substantially all of said volatiles have been evolved.

2. A method of continuously preparing a charge for an electric calcium carbide furnace, said method comprising the steps of forming a homogeneous mixture of pulverized bituminous coal having a good fluidizing property and a high percentage of volatiles, pulverized calcium carbonate and powdered calcium hydrate, extruding and cutting said mixture into pellets, drying said pellets, introducing a quantity of said pellets and a quantity of preheated air into a firing zone, coking and calcining autothermally the coal and the carbonate and hydrate in said firing zone by burning said volatiles from said coal, continuously tumbling said pellets during said coking and calcining step, said quantity of air being insufficient to completely burn said volatiles, moving said pellets, said preheated air, and the gaseous products from the coking and calcining step co-currently completely through said zone, and utilizing the heat sources in the gaseous products from the coking and calcining step to preheat the air supply and dry the pellets.

3. The method of preparing a charge for a calcium carbide electric arc furnace, said method comprising the steps of forming water, finely-divided soft coal having about 35% volatiles by weight and a good fluidizing property and a finely-divided calcium oxide source material selected from a group consisting of calcium hydrate and calcium carbonate into a homogeneous mixture which has ingredients so proportioned that the residual fixed carbon and residual calcium oxide will combine in the heat of an electric carbide furnace to form calcium carbide, extruding and cutting said mixture into small pellets, drying said pellets at a temperature of about 400° F., introducing continuously said pellets into one end of a firing zone which is heated above the temperature required for the combustion of initially-evolved coal volatiles, introducing continuously a quantity of preheated air into the said one end of said firing zone to oxidize only incompletely the evolved coal volatiles, regulating the quantity of preheated air which is introduced into said firing zone so that the temperature of the terminal part of the zone is maintained above the temperature at which calcium carbonate can exist at substantially atmospheric pressure, and causing the flow of the atmosphere in the kiln to move co-currently with the flow of pellets completely through said firing zone.

4. The method of firing pellets for a calcium carbide furnace charge by passing said pellets through a firing zone comprising, introducing a stream of pellets composed of particles of coal having a volatile content and particles of a calcium oxide source material selected from the group consisting of calcium hydrate and calcium carbonate into the entrance end portion of said firing zone, the amount of carbon in said coal being so proportioned in relation to the amount of calcium oxide in said source material as to provide pellets which after firing are suitable for the production of calcium carbide in a furnace, heating said pellets to cause said coal volatiles to be expelled therefrom and to calcine said calcium oxide source material in said firing zone, burning a portion of said volatiles in said firing zone with combustion air introduced into the entrance end portion of said firing zone in a regulated amount sufficient to burn only said portion of said expelled volatiles thereby providing an atmosphere in the exit end portion of said firing zone which is substantially devoid of oxygen and so minimizing a fixed carbon loss in said stream of pellets, maintaining the exit end portion of said firing zone at a temperature above the decomposition temperature of calcium carbonate, and removing both the fired pellets and the gases in the firing zone atmosphere from the exit end portion of said firing zone.

5. The method according to claim 4 and including burning the residual volatiles exteriorly of said zone and bringing the combustion products of said burning of residual volatiles into the heat exchange with air to be introduced.

6. The method of firing pellets for a calcium carbide furnace charge by passing said pellets through a firing zone comprising, introducing a stream of pellets composed of particles of coal having a volatile content and particles of a calcium oxide source material into the entrance end portion of said firing zone, said source material consisting of calcium carbonate and calcium hydrate with the calcium hydrate being present in an amount sufficient to furnish 15% or more by weight of the total calcium oxide in the fired pellet, the amount of carbon in said coal being so proportioned in relation to the total amount of calcium oxide in said source material as to provide pellets which after firing are suitable for the production of calcium carbide in a furnace, heating said pellets to cause said coal volatiles to be expelled therefrom, burning a portion of said volatiles in said firing zone with combustion air introduced into the entrance end portion of said firing zone to furnish heat for converting said source material to calcium oxide, said combustion air being introduced in an amount insufficient to burn all of said expelled volatiles thereby providing an atmosphere in the exit end portion of said firing zone which is substantially devoid of oxygen and so minimizing a fixed carbon loss in said stream of pellets, maintaining the exit end portion of said firing zone at a temperature above the decomposition temperature of calcium carbonate, and removing both the fired pellets and the gases in the firing zone atmosphere from the exit end portion of said firing zone.

7. The method of preparing a charge for a calcium carbide furnace comprising the steps of forming small pellets from a mixture of a finely-divided calcium oxide source material, selected from the group consisting of calcium hydrate and calcium carbonate, and finely-divided coal containing volatiles, said mixture being such that, after firing, the pellet is suitable for the formation of calcium carbide, introducing said pellets and air into one end of a firing zone, heating said pellets in said firing zone in order to devolatize said coal into coke and volatiles and to calcine said calcium oxide source material into calcium oxide and vapors, effecting at least part of said heating by incompletely burning said volatiles after being evolved from said pellets with said air in said firing zone, controlling the quantity of said introduced air relative to the quantity of the volatiles in said coal so that only a predetermined part of said volatiles are burned and said incomplete burning results, moving said pellets and the atmosphere of said firing zone cocurrently completely through said firing zone and in direct contact throughout said zone; whereby the atmosphere near the other end of the firing zone is substantially devoid of oxygen and hence any fixed carbon loss is minimized.

8. The method of preparing a charge for a calcium carbide furnace comprising the steps of forming small pellets from a mixture of finely-divided calcium oxide source material and finely-divided coal containing volatiles, said source material consisting of calcium carbonate and calcium hydrate with the calcium hydrate being present in an amount sufficient to furnish 15% or more by weight of the total calcium oxide in the fired pellet, said mixture being such that, after firing, the pellet is suitable for the formation of calcium carbide, introducing said pellets and air into one end of a firing zone, heating said pellets in said firing zone in order to devolatize said coal into coke and volatiles and to calcine said calcium oxide source material into calcium oxide and vapors, effecting at least part of said heating by incompletely burning said volatiles after being evolved from said pellets with said air in said firing zone, controlling the quantity of said introduced air relative to the quantity of the volatiles in said coal so that only a predetermined part of said volatiles are burned and said incomplete burning results, and moving said pellets and the atmosphere of said firing zone cocurrently completely through said firing zone and in direct contact throughout said zone, whereby the atmosphere near the other end of the firing zone is substantially devoid of oxygen and hence any fixed carbon loss is minimized.

9. The method according to claim 7 and being further characterized in that said coal having volatiles also has a good fluidizing property.

10. The method according to claim 7 and being further characterized by the coal having sufficient volatiles as to make the heating step autothermal.

11. The method according to claim 7 and being further characterized by the step of utilizing heat sources derived from said firing zone atmosphere to preheat the air which is introduced.

12. The method according to claim 7 and further including the feature of maintaining the other exit end portion of said firing zone above the temperature at which carbon dioxide is evolved from calcium carbonate at substantially atmospheric pressure.

References Cited in the file of this patent

UNITED STATES PATENTS

| Number | Name | Date |
|---|---|---|
| 1,292,387 | Becket | Jan. 21, 1919 |
| 1,310,465 | Becket | July 22, 1919 |
| 1,957,364 | Stafford | May 1, 1934 |
| 2,536,365 | Handwerk et al. | Jan. 2, 1951 |